US011262900B1

(12) United States Patent
Burkhead et al.

(10) Patent No.: US 11,262,900 B1
(45) Date of Patent: Mar. 1, 2022

(54) GRAPHICAL USER INTERFACE IN A COMPUTER SYSTEM IN AN AIRCRAFT

(71) Applicant: The Boeing Company, Chicago, IL (US)

(72) Inventors: Paul D. Burkhead, Seattle, WA (US); Alireza Majd, Seattle, WA (US); John Wiedemann, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/434,720

(22) Filed: Jun. 7, 2019

Related U.S. Application Data

(63) Continuation of application No. 16/049,183, filed on Jul. 30, 2018, now abandoned.

(51) Int. Cl.
| | |
|---|---|
| *G06F 3/0484* | (2013.01) |
| *G06F 3/0488* | (2013.01) |
| *B64D 43/00* | (2006.01) |
| *G06F 3/0482* | (2013.01) |
| *G06F 3/04847* | (2022.01) |
| *G06F 3/04883* | (2022.01) |

(52) U.S. Cl.
CPC ......... *G06F 3/04847* (2013.01); *B64D 43/00* (2013.01); *G06F 3/0482* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 4,827,419 A | * | 5/1989 | Selby, III | G01C 21/20 701/528 |
| 5,519,392 A | * | 5/1996 | Oder | G01C 21/22 340/990 |
| 5,659,475 A | * | 8/1997 | Brown | G08G 5/0026 701/120 |
| 5,732,384 A | * | 3/1998 | Ellert | G08G 5/0026 701/120 |
| 5,764,508 A | * | 6/1998 | Harper | G06K 17/00 235/449 |
| 5,907,568 A | * | 5/1999 | Reitan, Jr. | G01S 7/22 342/26 B |

(Continued)

OTHER PUBLICATIONS

E. Letsu-Dake, D. Pepitone, J. Ball and R. Burgin, "Recommendations for managing complexity in electronic chart information displays," 2014 IEEE/AIAA 33rd Digital Avionics Systems Conference (DASC), Colorado Springs, CO, 2014, pp. 4B1-1-4B1-14, doi: 10.1109/DASC.2014.6979467. (Year: 2014).*

(Continued)

*Primary Examiner* — William L Bashore
*Assistant Examiner* — Nathan K Shrewsbury
(74) *Attorney, Agent, or Firm* — Yee & Associates, P.C,

(57) ABSTRACT

A method, apparatus, and system for displaying information for an aircraft on a display device in a flight deck of the aircraft. Aircraft information is received for a current flight of the aircraft. An interactive strip is displayed in a graphical user interface on the display device in the flight deck of the aircraft. The aircraft information and controls are displayed within regions in the interactive strip, enabling a pilot to operate the aircraft using the interactive strip.

22 Claims, 11 Drawing Sheets

(56) References Cited

U.S. PATENT DOCUMENTS

| | | | |
|---|---|---|---|
| 5,913,912 A * | 6/1999 | Nishimura | G08G 5/0043 701/32.3 |
| 6,131,065 A * | 10/2000 | Marszalek | G08G 5/0026 244/1 R |
| 6,419,188 B1 | 7/2002 | Chapman, Jr. | |
| 6,643,580 B1 * | 11/2003 | Naimer | G01C 21/005 244/1 R |
| 6,836,239 B2 * | 12/2004 | Scott | G01S 7/298 181/182 |
| 6,845,324 B2 * | 1/2005 | Smith | G08B 27/006 702/3 |
| 6,920,390 B2 * | 7/2005 | Mallet | G08G 5/0026 340/988 |
| 7,321,318 B2 | 1/2008 | Crane et al. | |
| 8,111,186 B2 * | 2/2012 | Bunch | G01S 7/22 342/26 B |
| 8,159,464 B1 | 4/2012 | Gribble et al. | |
| 8,590,839 B2 | 11/2013 | Giannelli et al. | |
| 8,874,288 B1 * | 10/2014 | Siddiqui | G08G 5/0091 701/14 |
| 8,892,274 B2 | 11/2014 | Baudry | |
| 9,081,498 B2 * | 7/2015 | Thorsander | G06F 3/04883 |
| 9,128,594 B1 * | 9/2015 | Hufnagel | G01C 23/005 |
| 9,280,261 B2 * | 3/2016 | Yach | G06F 1/1626 |
| 9,302,779 B2 | 4/2016 | Zaneboni et al. | |
| 9,452,839 B2 | 9/2016 | Chatrenet et al. | |
| 9,567,098 B2 * | 2/2017 | Kou | G01C 23/00 |
| 9,620,021 B1 * | 4/2017 | Barber | B64D 43/00 |
| 9,669,941 B1 * | 6/2017 | Oudom | B64D 45/00 |
| 9,672,747 B2 * | 6/2017 | Shipley | G08G 5/0052 |
| 9,703,476 B1 | 7/2017 | Pappas et al. | |
| 9,710,145 B2 | 7/2017 | Zammit-Mangion et al. | |
| 9,772,712 B2 | 9/2017 | Kneuper et al. | |
| 9,989,991 B1 | 6/2018 | Kuefler et al. | |
| 10,360,801 B2 * | 7/2019 | Taylor | G08G 5/0091 |
| 10,710,725 B2 * | 7/2020 | Sinusas | B64D 25/02 |
| 10,761,676 B1 | 9/2020 | Gilbert et al. | |
| 11,137,873 B1 | 10/2021 | Gilbert et al. | |
| 2004/0210847 A1 | 10/2004 | Berson et al. | |
| 2005/0216139 A1 * | 9/2005 | Laughlin | G06Q 30/00 701/3 |
| 2006/0184253 A1 | 8/2006 | Andrews et al. | |
| 2007/0038939 A1 * | 2/2007 | Challen | G05B 15/02 715/734 |
| 2007/0176797 A1 | 8/2007 | Rhodes et al. | |
| 2008/0042923 A1 * | 2/2008 | De Laet | G06F 3/1454 345/1.3 |
| 2008/0282201 A1 | 11/2008 | Cabaret et al. | |
| 2009/0073165 A1 * | 3/2009 | McCullough | G06T 15/10 345/420 |
| 2009/0118997 A1 * | 5/2009 | Truitt | G08G 5/0026 701/120 |
| 2009/0153343 A1 | 6/2009 | Shafaat et al. | |
| 2011/0102198 A1 | 5/2011 | Deleris et al. | |
| 2011/0313597 A1 | 12/2011 | Wilson et al. | |
| 2012/0035849 A1 * | 2/2012 | Clark | G01C 23/00 701/467 |
| 2012/0075123 A1 | 3/2012 | Keinrath et al. | |
| 2012/0075166 A1 | 3/2012 | Marti et al. | |
| 2013/0027226 A1 * | 1/2013 | Cabos | G08G 5/0021 340/961 |
| 2013/0138272 A1 | 5/2013 | Louise-Babando et al. | |
| 2013/0234867 A1 * | 9/2013 | Martin | G01C 23/005 340/971 |
| 2013/0261851 A1 * | 10/2013 | Komer | G06F 3/0488 701/3 |
| 2013/0265177 A1 | 10/2013 | Berger et al. | |
| 2014/0075075 A1 | 3/2014 | Morrill et al. | |
| 2014/0156115 A1 * | 6/2014 | Aymeric | G06F 3/04817 701/3 |
| 2014/0164983 A1 * | 6/2014 | Kawalkar | G06F 3/04886 715/781 |
| 2014/0209740 A1 | 7/2014 | Guering et al. | |
| 2015/0002403 A1 * | 1/2015 | Dostal | G06F 3/04886 345/173 |
| 2015/0058777 A1 * | 2/2015 | Graumann | G06F 3/04842 715/771 |
| 2015/0261379 A1 * | 9/2015 | Kneuper | G08G 5/0052 345/173 |
| 2015/0355832 A1 * | 12/2015 | Dostal | G01C 21/00 715/771 |
| 2016/0004374 A1 * | 1/2016 | Kneuper | G06F 3/0484 345/173 |
| 2016/0123763 A1 | 5/2016 | Wischmeyer | |
| 2016/0202870 A1 * | 7/2016 | Takahashi | G06F 3/04886 715/821 |
| 2016/0347176 A1 | 12/2016 | Kawalkar | |
| 2017/0075558 A1 | 3/2017 | Shapiro et al. | |
| 2017/0183105 A1 * | 6/2017 | Fournier | G08G 5/0052 |
| 2017/0259935 A1 | 9/2017 | Hausmann et al. | |
| 2017/0275018 A1 * | 9/2017 | Narra | B64D 45/00 |
| 2017/0277185 A1 | 9/2017 | Duda et al. | |
| 2017/0314959 A1 * | 11/2017 | Chavez | G06F 3/04886 |
| 2019/0096267 A1 | 3/2019 | Shamasundar et al. | |
| 2019/0352018 A1 * | 11/2019 | Bohanan | G06F 3/0362 |
| 2019/0375514 A1 * | 12/2019 | Lampazzi | G09G 5/38 |
| 2019/0384490 A1 | 12/2019 | Morowsky et al. | |
| 2020/0241565 A1 | 7/2020 | Bosworth et al. | |
| 2020/0264599 A1 * | 8/2020 | Sahay | G06F 3/0481 |
| 2020/0402412 A1 * | 12/2020 | Shamasundar | G01C 23/005 |
| 2021/0019045 A1 * | 1/2021 | Caillaud | G06F 3/0414 |

OTHER PUBLICATIONS

Gilbert et al., "Graphical User Interface in a Computer System in an Aircraft," U.S. Appl. No. 16/434,763, filed Jun. 7, 2019, 58 pages.

K. T. Snyder, S. Sokoloff and M. Bearden, "The cockpit associate: A 'co-pilot in a box' for general aviation," Digital Avionics Systems Conference, 2003. DASC '03. The 22nd, Indianapolis, IN, USA, 2003, pp. 12.C.3-121-12 vol. 2, doi: 10.1109/DASC.2003.1245953. (Year: 2003).

S. S. Mulgund and G. L. Zacharias, "A situation-driven adaptive pilot/vehicle interface," Proceedings Third Annual Symposium onHuman Interaction with Complex Systems. HICS'96, Dayton, OH, USA, 1996, pp. 193-198, doi: 10.1109/HUICS.1996.549515. (Year: 1996).

Final Office Action, dated Mar. 5, 2021, regarding U.S. Appl. No. 16/434,763, 23 pages.

Notice of Allowance, dated Apr. 30, 2020, regarding USPTO Appliction No. U.S. Appl. No. 16/140,885, 9 pages.

Notice of Allowance, dated Jun. 2, 2021, regarding U.S. Appl. No. 17/007,788, 14 pages.

Office Action, dated Jun. 25, 2021, regarding U.S. Appl. No. 16/434,763, 24 pages.

Office Action, dated Nov. 27, 2020, regarding USPTO Application No. 17/007,788, 16 pages.

Office Action, dated Oct. 3, 2019, regarding U.S. Appl. No. 16/140,885, 9 pages.

Office Action, dated Sep. 15, 2020, regarding U.S. Appl. No. 16/434,763, 22 pages.

* cited by examiner

GRAPHICAL USER INTERFACE IN A COMPUTER SYSTEM IN AN AIRCRAFT

CROSS-REFERENCE TO RELATED APPLICATION

This application is a continuation of U.S. application Ser. No. 16/049,183, entitled "Graphical User Interface in a Computer System in an Aircraft", filed Jul. 30, 2018, and incorporated herein by reference.

This application is related to U.S. Ser. No. 16/049,112, entitled "Graphical User Interface in a Computer System in an Aircraft", filed Jul. 30, 2018; and U.S. Ser. No. 16/140,885, now U.S. Pat. No. 10,761,676, entitled "Flight Deck Display Management System", filed Sep. 25, 2018, which are incorporated herein by reference.

BACKGROUND INFORMATION

1. Field

The present disclosure relates generally to aircraft and, in particular, to controlling an operation of an aircraft using a graphical user interface displayed on a display device in a cockpit of the aircraft.

2. Background

Commercial aircraft, such as jet airplanes, are complex, large-capacity aircraft used to transport people, cargo, or some combination thereof. A flight deck of a jet airplane has a myriad of display devices and physical controls used to operate the aircraft. These display devices and physical controls are used to control the operation of aircraft systems such as an engine, a fuel system, hydraulics, a navigation system, a radio, and other systems in the aircraft.

Currently, the different display devices in the flight deck of the aircraft include a primary flight display device, a navigation display device, and an engine-indicating and crew-alerting system (EICAS) display device. These and other display devices in the flight deck of the aircraft provide information to a flight crew to operate the aircraft.

Large amounts of information are displayed on these display devices. For example, the primary flight display device can display information such as air speed, altitude, attitude, rate of climb, autopilot, heading, and other information. As another example, the navigation display device can display information such as current setting, course, next waypoint, position, and other information. The engine-indicating and crew-alerting system display can display engine parameters such as revolutions per minute, temperature, fuel flow, fuel quantity, wheel pressure, and other suitable types of information.

These and other display devices require the flight crew to know which display devices to view for the information needed to operate the aircraft.

Additionally, once the needed information is located, the flight crew also needs to be able to quickly locate and manipulate physical controls such as switches, levers, or dials to make desired adjustments or changes.

The number of display devices and physical controls can increase the amount of time needed to perform tasks for a flight of the aircraft. Further, these display devices and physical controls can also increase the amount of mental concentration needed to properly perform tasks to operate the aircraft.

Additionally, the composition and arrangement of the display devices and physical controls can vary from one aircraft to another aircraft. This variation can limit the types of aircraft that pilots or other flight crew can operate without additional training.

Therefore, it would be desirable to have a method and apparatus that take into account at least some of the issues discussed above, as well as other possible issues. For example, it would be desirable to have a method and apparatus that overcome a technical problem with a number of display devices and physical controls in a flight deck of an aircraft.

SUMMARY

In one illustrative embodiment, an aircraft control system comprises a computer system in an aircraft, a touch screen display device in the computer system, and an information controller running on the computer system. The touch screen display device is located in a flight deck of the aircraft as a forward display. The information controller receives aircraft information from a group of aircraft systems in the aircraft and displays an interactive strip in a graphical user interface on the touch screen display device. The aircraft information and controls are located within regions in the interactive strip in which the aircraft information is for a current flight of the aircraft. The information controller sends a command to the group of aircraft systems in the aircraft when a control in the controls in the interactive strip is manipulated by a user input made to the touch screen display device, enabling a pilot to operate the aircraft using the interactive strip In another illustrative embodiment, an aircraft control system comprises a computer system in an aircraft, a display device in the computer system, and an information controller running on the computer system. The information controller displays an interactive strip in a graphical user interface on the display device in which aircraft information and controls are located within regions in the interactive strip. The aircraft information is for a current flight of the aircraft, enabling a pilot to operate the aircraft using the interactive strip.

In yet another illustrative embodiment, a method is present for displaying information for an aircraft on a display device in a flight deck of the aircraft. Aircraft information is received for a current flight of the aircraft. An interactive strip is displayed in a graphical user interface on the display device in the flight deck of the aircraft. The aircraft information and controls are displayed within regions in the interactive strip, enabling a pilot to operate the aircraft using the interactive strip.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it would be desirable to reduce an amount and complexity of information displayed at any one time in a flight deck of an aircraft. The illustrative embodiments recognize and take into account that display devices and physical controls are costly and take up valuable real estate in the flight deck of the aircraft. The illustrative embodiments also recognize and take into account that the display devices and physical controls currently used take up room and add weight to the aircraft. Further, the illustrative embodiments recognize and take into account that the use of these display devices and physical controls reduces pilot comfort as well as ease of ingress and egress to the flight deck.

The illustrative embodiments recognize and take into account that replacing physical switches, sliders, and dials with graphical controls on a display device can reduce complexity and clutter in the flight deck of the aircraft. Thus, illustrative embodiments provide a method, an apparatus, and a system for displaying information on a display device in an aircraft.

In one illustrative example, aircraft information is received for a current flight of an aircraft. The process displays an interactive strip in a graphical user interface on a display device in the flight deck of the aircraft. The process displays the aircraft information and controls within regions in the strip, enabling a pilot to operate the aircraft using the interactive strip. This interactive strip can be displayed on the same display device as the information from other systems, such as a flight management system in a navigation system.

Figure 1:
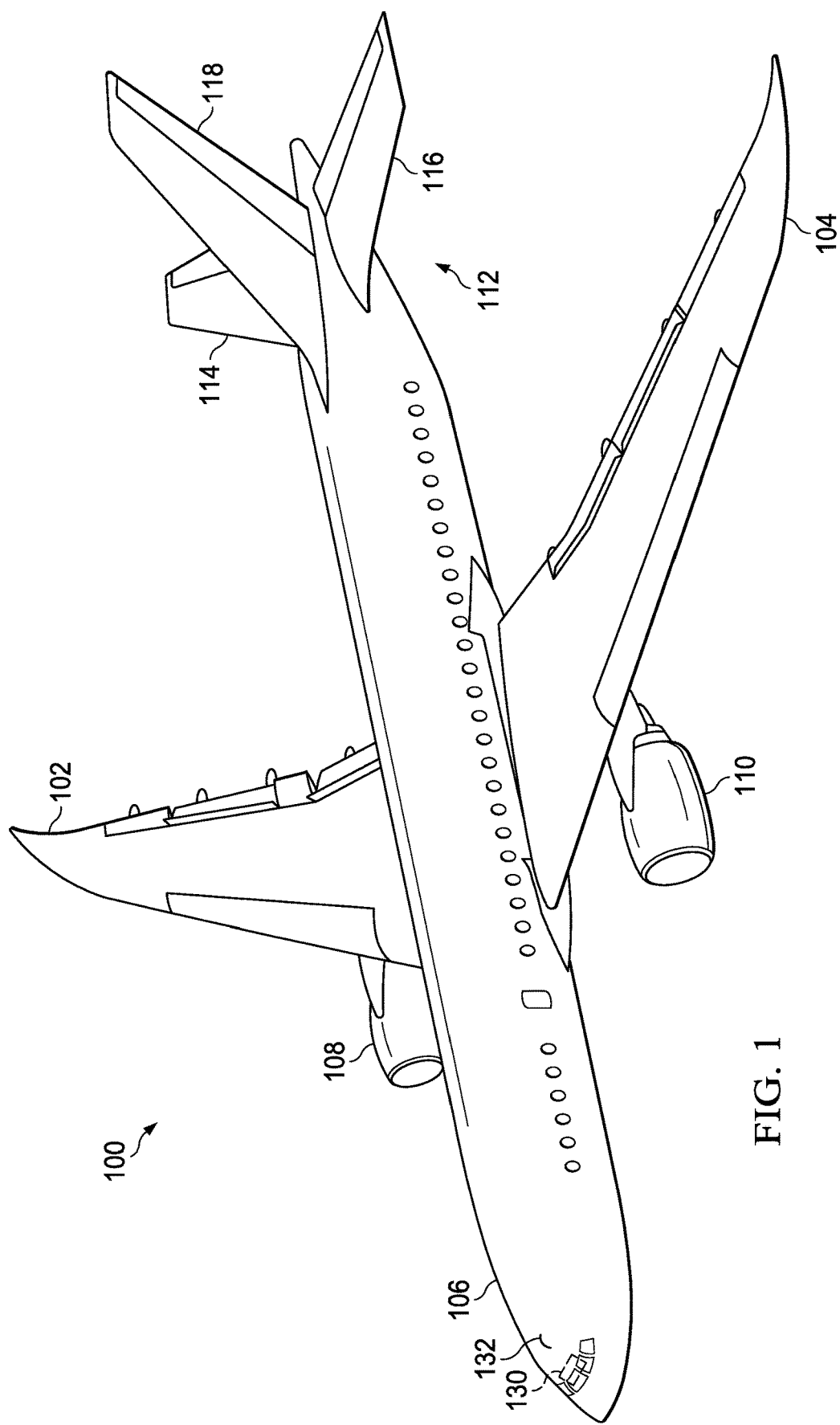
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which an aircraft control system may be implemented in accordance with an illustrative embodiment. In this illustrative example, display system 130 in the aircraft control system can be located in flight deck 132 of aircraft 100. Display system 130 can have a group of display devices utilized by a flight crew to operate aircraft 100. As used herein, "a group of," when used with reference to items, means one or more items. For example, "a group of display devices" is one or more display devices.

In this illustrative example, display system 130 includes a display device that operates in a manner that reduces at least one of a need for physical controls or a complexity of information displayed. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
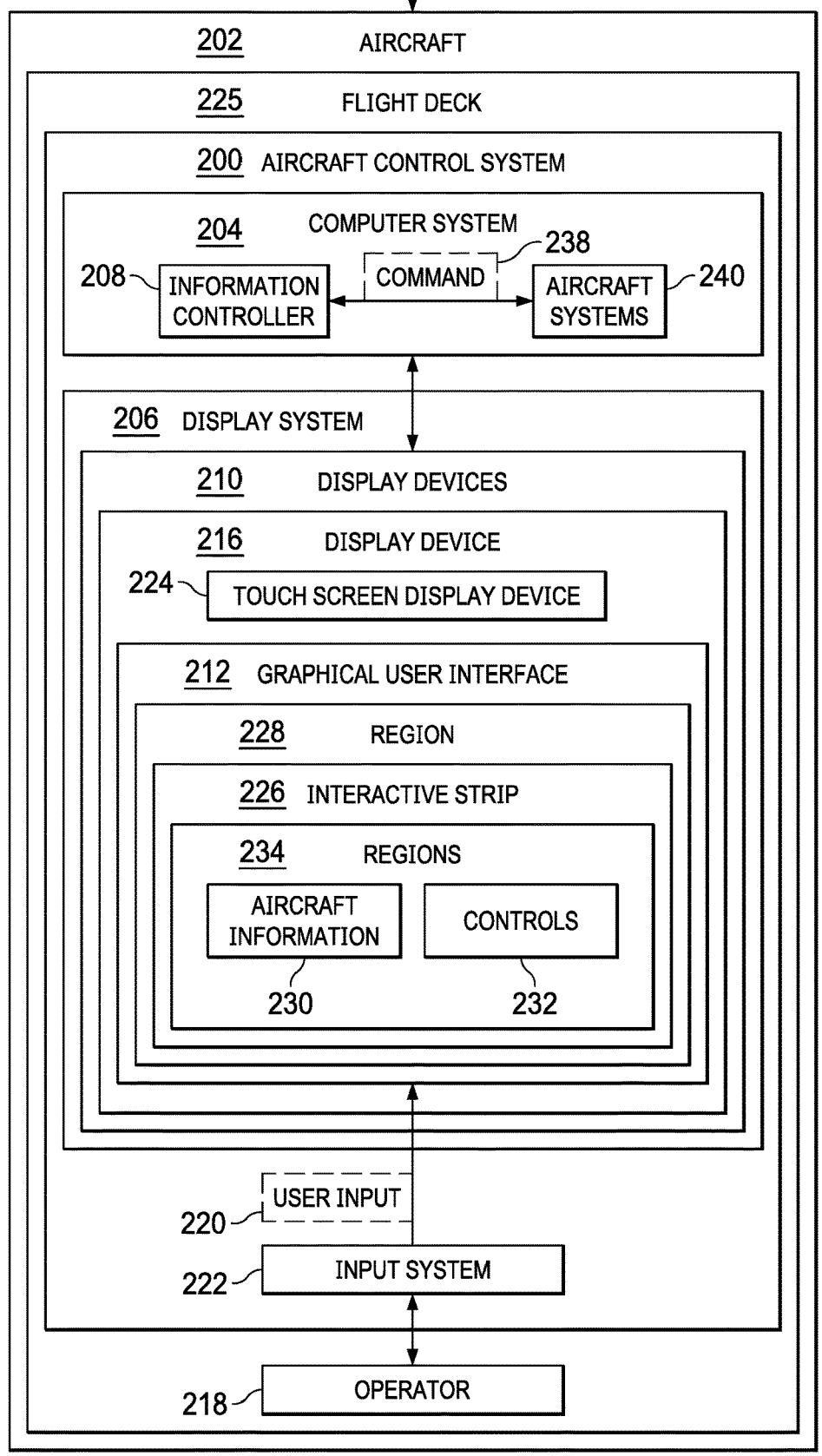
FIG. 2 is an illustration of a block diagram of an aircraft control system in accordance with an illustrative embodiment.

With reference now to FIG. 2, an illustration of a block diagram of an aircraft control system is depicted in accordance with an illustrative embodiment. In this illustrative example, aircraft control system 200 is located in aircraft 202. Aircraft 100 in FIG. 1 is an example of one implementation for aircraft 202 shown in block form in FIG. 2.

In this illustrative example, aircraft control system 200 includes a number of different components. As depicted, aircraft control system 200 comprises computer system 204, display system 206, and information controller 208.

Computer system 204 is a physical hardware system and includes one or more data processing systems. When more than one data processing system is present, those data processing systems are in communication with each other using a communications medium. The communications medium may be a network. In this example, the communications medium may include an Aeronautical Radio Incorporated (ARINC) bus system, a wireless network, a fiber-optic network, a wired network, or other types of communications mediums.

The data processing systems in computer system 204 can take a number of different forms. For example, the data processing systems may be selected from at least one of a computer, a server computer, a tablet, a line replaceable unit (LRU), or some other suitable data processing system.

As depicted, display system 206 is a physical hardware system and includes one or more of display devices 210 on which graphical user interface 212 may be displayed. Display devices 210 may include at least one of a light-emitting diode (LED) display, a liquid crystal display (LCD), a touch screen display, an organic light-emitting diode (OLED) display, a computer monitor, a projector, a flat panel display, or some other suitable device that can output information for a presentation of the information.

In this illustrative example, display system 206 is configured to display graphical user interface 212 on display device 216 in display devices 210. Operator 218 is a person that may interact with graphical user interface 212 through user input 220 generated by input system 222 for computer system 204. Input system 222 is a physical hardware system and may be selected from at least one of a mouse, a keyboard, a trackball, a touch screen, a stylus, a motion sensing input device, a cyber glove, or some other suitable type of input device. In this particular example, display device 216 is touch screen display device 224 in which at least a portion of input system 222 is integrated into display device 216.

As depicted, display device 216 is located in flight deck 225. Display device 216 can be a forward display in flight deck 225. In this illustrative example, operator 218 is a number of flight crew for aircraft 202. In particular, operator 218 can be a pilot of aircraft 202.

As depicted, information controller 208 runs on computer system 204. In this illustrative example, information controller 208 displays interactive strip 226 in region 228 of graphical user interface 212. In this illustrative example, interactive strip 226 remains in a fixed location in region 228 in graphical user interface 212. For example, if the displays of the other information are moved within graphical user interface 212, changing the location of the displays of information causes these displays to move around interactive strip 226 while interactive strip 226 remains fixed in the same location.

In this illustrative example, information controller 208 displays interactive strip 226 in graphical user interface 212 on display device 216 in which aircraft information 230 and controls 232 are located within regions 234 in interactive strip 226. As depicted, aircraft information 230 is for current flight 236 of aircraft 202, enabling a pilot to operate aircraft 202 using interactive strip 226. Aircraft information 230 is dynamically updated with current aircraft data. In other words, aircraft information 230 changes as new data is available for use in operating aircraft 202.

Information controller 208 can receive aircraft information 230 from different systems in aircraft 202. For example, aircraft information 230 can be received from a group of aircraft systems 240 in aircraft 202.

In the illustrative example, information controller 208 is configured to send command 238 to the group of aircraft systems 240 in aircraft 202. The group of aircraft systems 240 comprises at least one of an engine, a fuel system, hydraulics, a navigation system, a radio, a flight entertainment system, and engine-indicating and crew-alerting system, or other systems in aircraft 202.

As depicted, information controller 208 can send command 238 when controls 232 in interactive strip 226 is manipulated by user input 220. In this illustrative example, user input 220 can be made by operator 218 touching touch screen display device 224, enabling operator 218, in the form of a crew member such as a pilot, to operate aircraft 202 using interactive strip 226.

Information controller 208 can be implemented in software, hardware, firmware or a combination thereof. When software is used, the operations performed by information controller 208 may be implemented in program code configured to run on hardware, such as a processor unit. When firmware is used, the operations performed by information controller 208 may be implemented in program code and data and stored in persistent memory to run on a processor unit. When hardware is employed, the hardware may include circuits that operate to perform the operations in information controller 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In one illustrative example, one or more technical solutions are present that overcome a technical problem with the number of display devices and controls in a flight deck of an aircraft. As a result, one or more technical solutions may provide a technical effect of at least one of reducing the number of display devices or physical controls used in the flight deck of the aircraft. Further, one or more technical solutions also may provide a technical effect of enabling the flight crew of the aircraft to more easily find information relevant to the operation of the aircraft for the flight of the aircraft.

As a result, computer system 204 operates as a special purpose computer system in which information controller 208 in computer system 204 enables displaying interactive strip 226 to operator 218 with aircraft information 230 for current flight 236 of aircraft 202. In particular, information controller 208 transforms computer system 204 into a special purpose computer system as compared to currently available general computer systems that do not have information controller 208.

Figure 3:
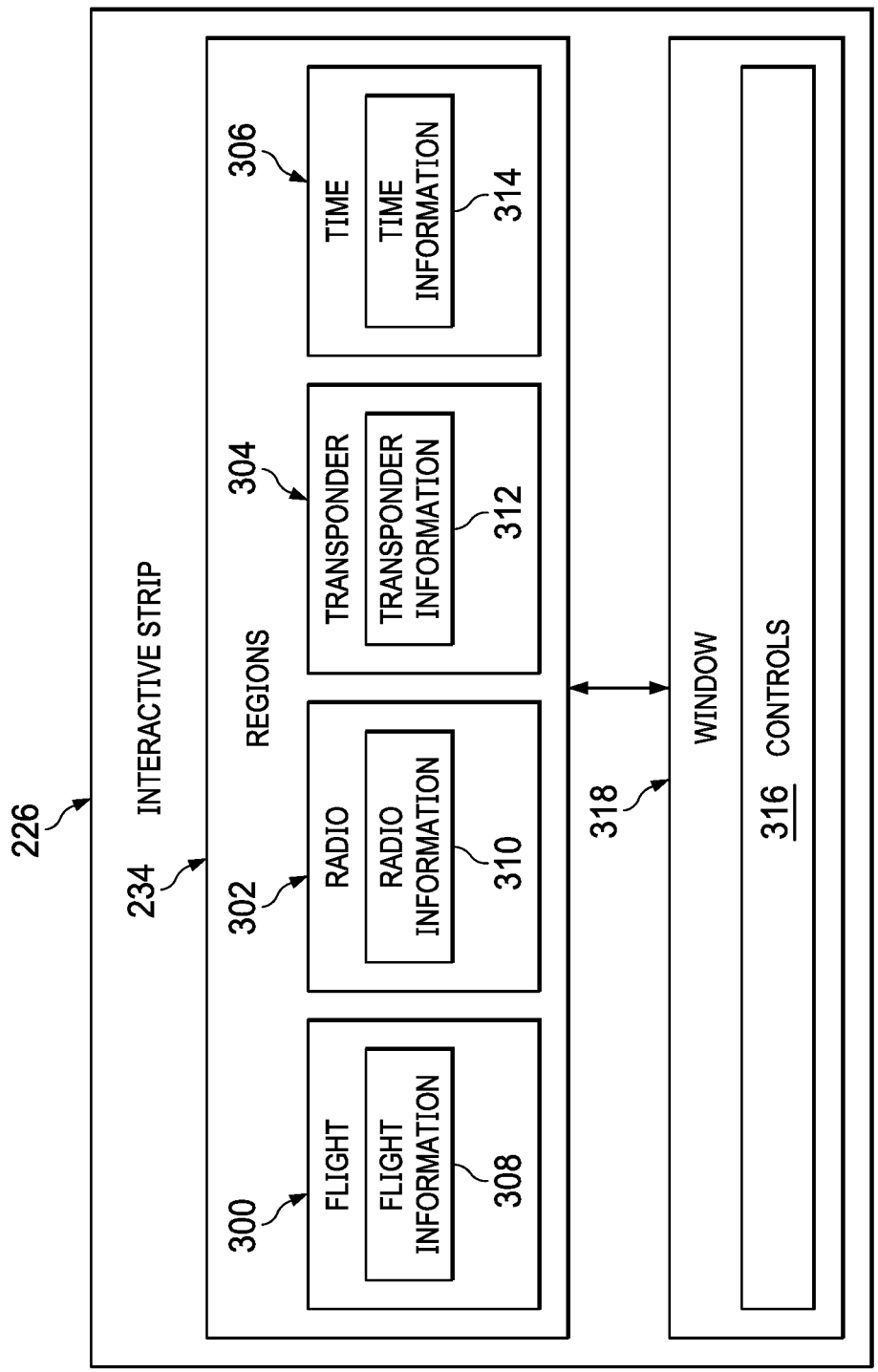
FIG. 3 is an illustration of a block diagram of a dynamic control center in accordance with an illustrative embodiment.

With reference now to FIG. 3, an illustration of a block diagram of a dynamic control center is depicted in accordance with an illustrative embodiment. In the illustrative examples, the same reference numeral may be used in more than one figure. This reuse of a reference numeral in different figures represents the same element in the different figures.

As depicted, information controller 208 displays regions 234 in interactive strip 226. In this illustrative example, regions 234 comprises flight 300, radio 302, transponder 304, and time 306. Aircraft information 230 is displayed in regions 234 for current flight 236.

In this illustrative embodiment, flight 300 in regions 234 in interactive strip 226 displays flight information 308 for current flight 236. In this example, flight information 308 includes airport code and flight number.

As depicted, radio 302 in regions 234 displays radio information 310 for use in current flight 236. In this example, radio information 310 includes a communications channel and frequency.

Transponder 304 displays transponder information 312. As depicted, this information includes a transponder code and mode of the transponder. Time 306 display time information 314. In this illustrative example, time information 314 includes time and date. In addition, the time and date can include flight times, waypoint times, or other times. Further, time information 314 also may display timer or stopwatch.

As depicted, a group of controls 316 can be displayed. The group of controls 316 can be displayed in or in association with interactive strip 226. A control is a graphical user interface element that is configured to receive user input for use in operating aircraft 202 during current flight 236. The group of controls 316 can be selected from at least one of a text field, a dial, a button, a slider, or some other control. Controls 316 can be displayed in window 318 for the selected region in regions 234. Window 318 can take different forms. For example, window 318 can be selected from a group comprising a pop-up window, a message window, a dialog box, or some other type of window.

As depicted, information controller 208 displays window 318 when a region in regions 234 is selected by user input 220. For example, a control can be a button displayed in window 318 in the form of a pop-up window. In another example, the control can be a button, a dial, or a slider located in one of regions 234 in interactive strip 226 without window 318.

In one illustrative example, window 318 can be a pop-up window can be displayed when one of regions 234 in interactive strip 226 is selected by user input 220. For example, a pop-up window can be available for flight 300, radio 302, transponder 304, and time 306. In this example, one pop-up window is displayed at a time. Further, the pop-up window is displayed as the topmost layer in graphical user interface 212. With this example, user input 220 outside the pop-up window causes the pop-up window to close. Additionally, the pop-up window may include a dedicated close button.

Thus, user input 220 to window 318 can be received to interact with computer system 204 to operate aircraft 202. In response to the user input, information controller 208 can send command 238 to at least one of a flight management system, an engine-indicating and crew-alerting system, a communications system, or some other system in computer system 204 or other system in aircraft 202. As a result, one or more technical solutions in the different illustrative examples reduces at least one of the number of displays, the number of physical controls, or space usage within flight deck 225 of aircraft 202.

Further, information controller 208 can dim other portions of graphical user interface 212 when a window is displayed. For example, interactive strip 226 can be dimmed or obscured when a pop-up window is displayed. The dimming or obscuring can also be performed for other displays within graphical user interface 212. The dimming or obscuring of these and other areas in graphical user interface 212 can be selected to reduce drawing the attention of operator 218 to portions of graphical user interface 212 that are unnecessary while interacting with interactive strip 226. Areas that are necessary remain unchanged.

Further, graphical indicators can be displayed to draw the attention of operator 218 or other crew members in flight deck 225 to particular portions of graphical user interface 212 as needed for new information that may be needed to operate aircraft 202 in a desired manner. These graphical indicators can be displayed for interactive strip 226 as well as other displays in different implementations. The graphical indicators can be selected from at least one of color, text, an icon, a badge, a pop-up window, bolding, animation, or other suitable types of graphical indicators that draw the attention of operator 218 or other crew members in flight deck 225.

The illustration of aircraft control system 200 and the different components in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, other display devices can be present in display system 206 for displaying information. As another example, a group of display devices, in addition to display device 216, can be present for other operators in addition to operator 218 when multiple operators are present in the flight crew in flight deck 225 of aircraft 202.

In another illustrative example, interactive strip 226 may have other numbers of regions other than the four regions shown in FIG. 3. For example, time 306 may be omitted from regions 234. As another example, an engine and crew region can be included in regions 234 of interactive strip 226 in which this region displays information from an engine-indicating and crew-alerting system (EICAS). As another example, interactive strip 226 can be movable to other locations in other implementations. For example, operator 218 can move interactive strip 226 to another location within graphical user interface 212. Interactive strip 226 will remain in that location even though other displays of information within graphical user interface 212 may be moved. In this manner, operator 218 can select the location desired for interactive strip 226. In yet other illustrative examples, interactive strip 226 can be moved in response to the movement of displays of information.

Figure 4:
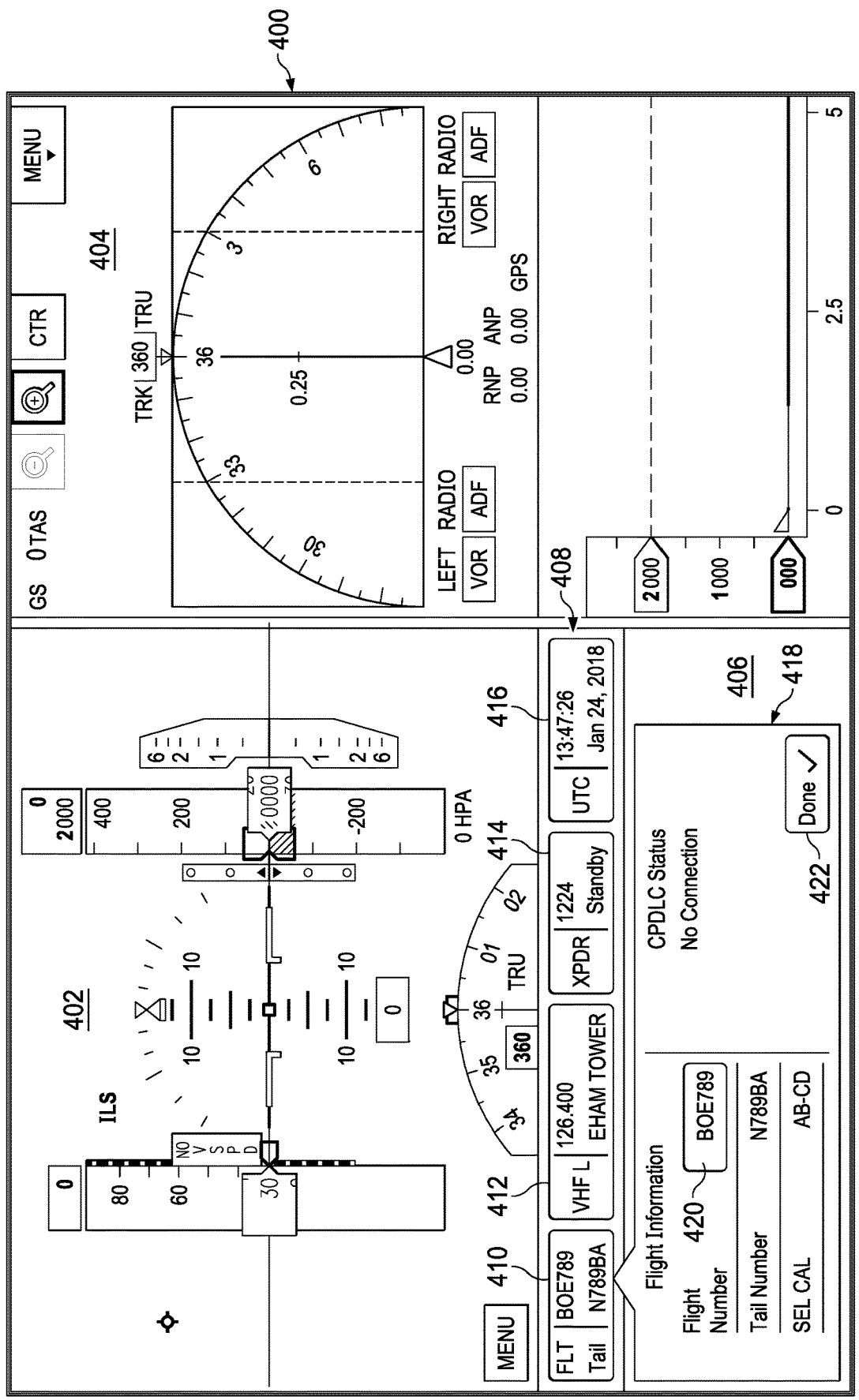
FIG. 4 is an illustration of a graphical user interface displayed on a display device in a flight deck of an aircraft in accordance with an illustrative embodiment.

With reference now to FIGS. 4-8, illustrations of interactions with an interactive strip are depicted in accordance with an illustrative embodiment. With reference first to FIG. 4, an illustration of a graphical user interface displayed on a display device in a flight deck of an aircraft is depicted in accordance with an illustrative embodiment. As depicted, graphical user interface 400 is an example of one implementation for graphical user interface 212 shown in block form in FIG. 2. As depicted, graphical user interface 400 can be displayed on display device 216 in display system 206 for aircraft 202 in FIG. 2. In this example, display device 216 can take the form of touch screen display device 224 in FIG. 2.

In this illustrative example, graphical user interface 400 includes a number of different types of displays that may be used by a flight crew. As depicted, graphical user interface 400 includes primary flight display (PFD) 402, navigation display (ND) 404, dynamic control center 406, and interactive strip 408. Interactive strip 408 is an example of one implementation of interactive strip 226 shown in block form in FIG. 2 and FIG. 3. In this illustrative example, interactive strip 408 remains fixed in the same location within graphical user interface 400. If other displays of information such as primary flight display 402 and navigation display 404 are moved within graphical user interface 400, interactive strip 408 does not change location in graphical user interface 400. In this manner, a crew member such as a pilot can always look to the same place in graphical user interface 400 to see the information in interactive strip 408.

These types of displays in graphical user interface 400 reduce the number of display devices needed in a flight deck of an aircraft to present information to the flight crew operating the aircraft.

In FIG. 4, interactive strip 408 includes regions as follows: flight 410, radio 412, transponder 414, and time 416. These regions display information for the current flight of the aircraft.

Pop-up windows for interactive strip 408 are utilized to provide more detailed information in a single step in response to the selection of one of the regions in interactive strip 408. In this manner, more detailed information can be more quickly obtained by a crew member.

As depicted, flight 410 has been selected by user input. This user input results in the display of flight pop-up window 418 in graphical user interface 400. In this illustrative example, the aircraft information displayed in flight pop-up window 418 includes flight information and a communications link status. Flight pop-up window 418 includes text field 420 which allows for receiving user input to change the flight number. Additionally, done button 422 can be selected to close flight pop-up window 418.

Figure 5:
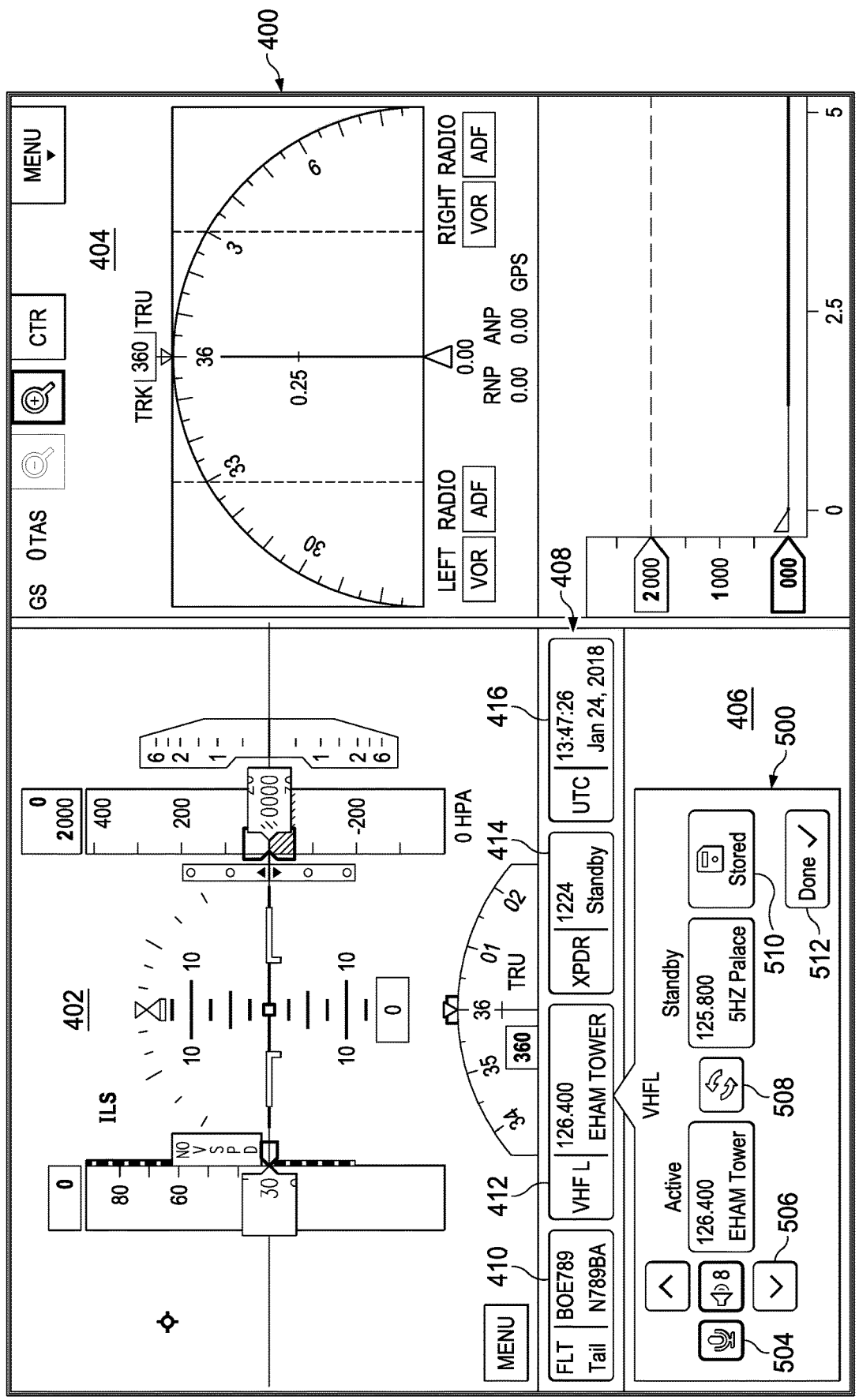
FIG. 5 is an illustration of a radio pop-up window in a graphical user interface displayed on a display device in a flight deck of an aircraft in accordance with an illustrative embodiment.

With reference next to FIG. 5, an illustration of a radio pop-up window in a graphical user interface displayed on a display device in a flight deck of an aircraft is depicted in accordance with an illustrative embodiment. In FIG. 5, radio 412 in interactive strip 408 has been selected by user input.

This user input causes the display of radio pop-up window 500. As depicted, radio pop-up window 500 displays controls that enable an operator to change settings for the communications channel. In this illustrative example, controls include microphone 504, volume 506, frequency setting 508, store 510, and done button 512.

Microphone 504 is a control that enables turning the microphone on and off. Volume 506 is a control that enables changing the volume. Frequency setting 508 enables receiving user input to change the frequency or communications channel. Store 510 is a control that can be selected by user input to store audio from a radio call. Done button 512 is a control that enables closing radio pop-up window 500.

Figure 6:
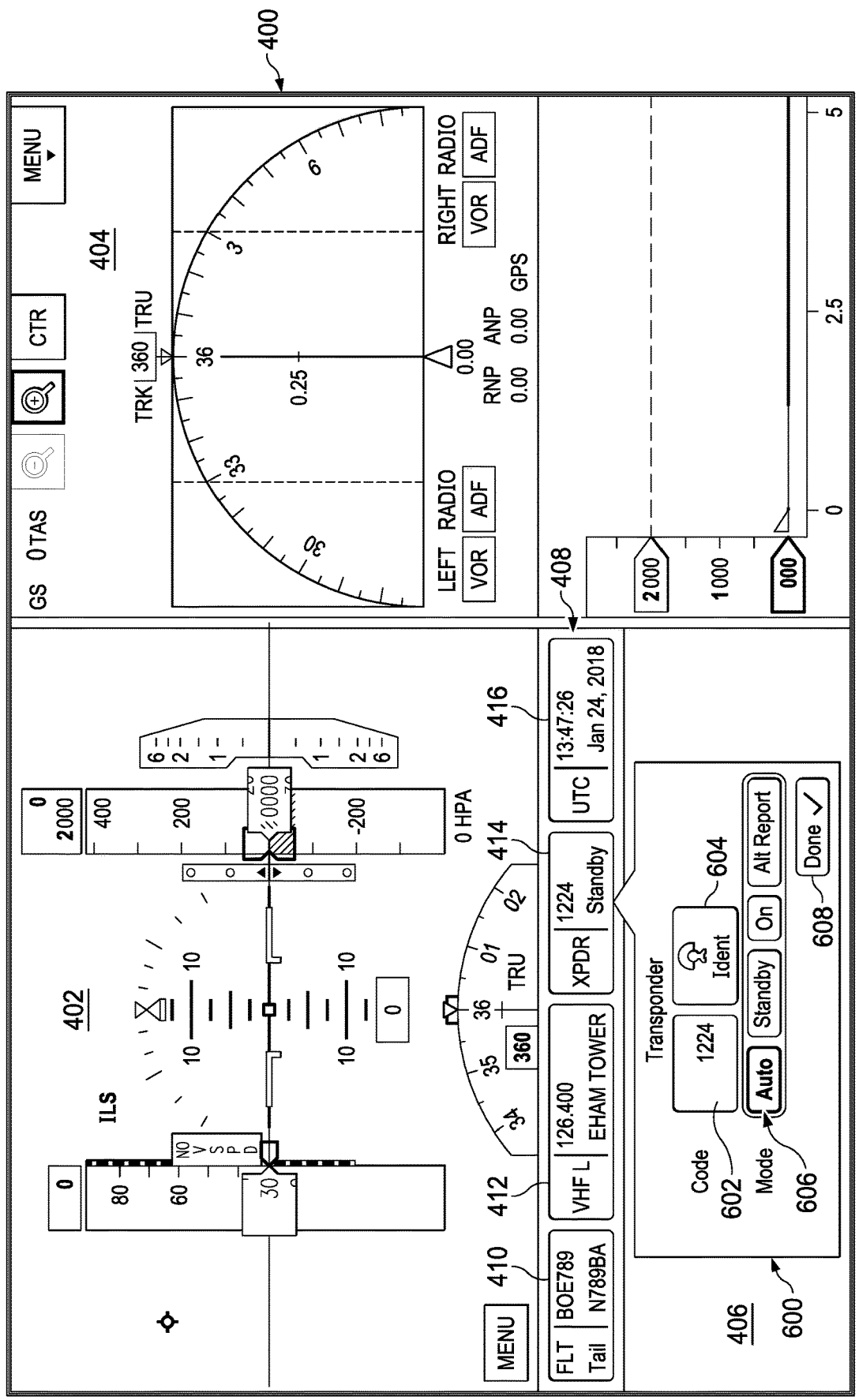
FIG. 6 is an illustration of a transponder pop-up window in a graphical user interface displayed on a display device in a flight deck of an aircraft in accordance with an illustrative embodiment.

Turning to FIG. 6, an illustration of a transponder pop-up window in a graphical user interface displayed on a display device in a flight deck of an aircraft is depicted in accordance with an illustrative embodiment. As depicted, the selection of transponder 414 in interactive strip 408 results in a display of transponder pop-up window 600 in graphical user interface 400. In this illustrative example, transponder pop-up window 600 contains controls that may be used by an operator to change the operation of a transponder in the aircraft.

As depicted, code field 602 is a control that can be selected to change the transponder. In this illustrative example, ident 604 is a control that can be selected to trigger an ident function in which an IDENT bit is transmitted by the transponder for use by a ground-based radar system. Mode selector buttons 606 can be used to select a mode of operation for the transponder. In this example, the mode can be changed between auto, standby, on, and alt report modes using mode selector buttons 606.

As depicted, done button 608 can be selected to close transponder pop-up window 600.

Figure 7:
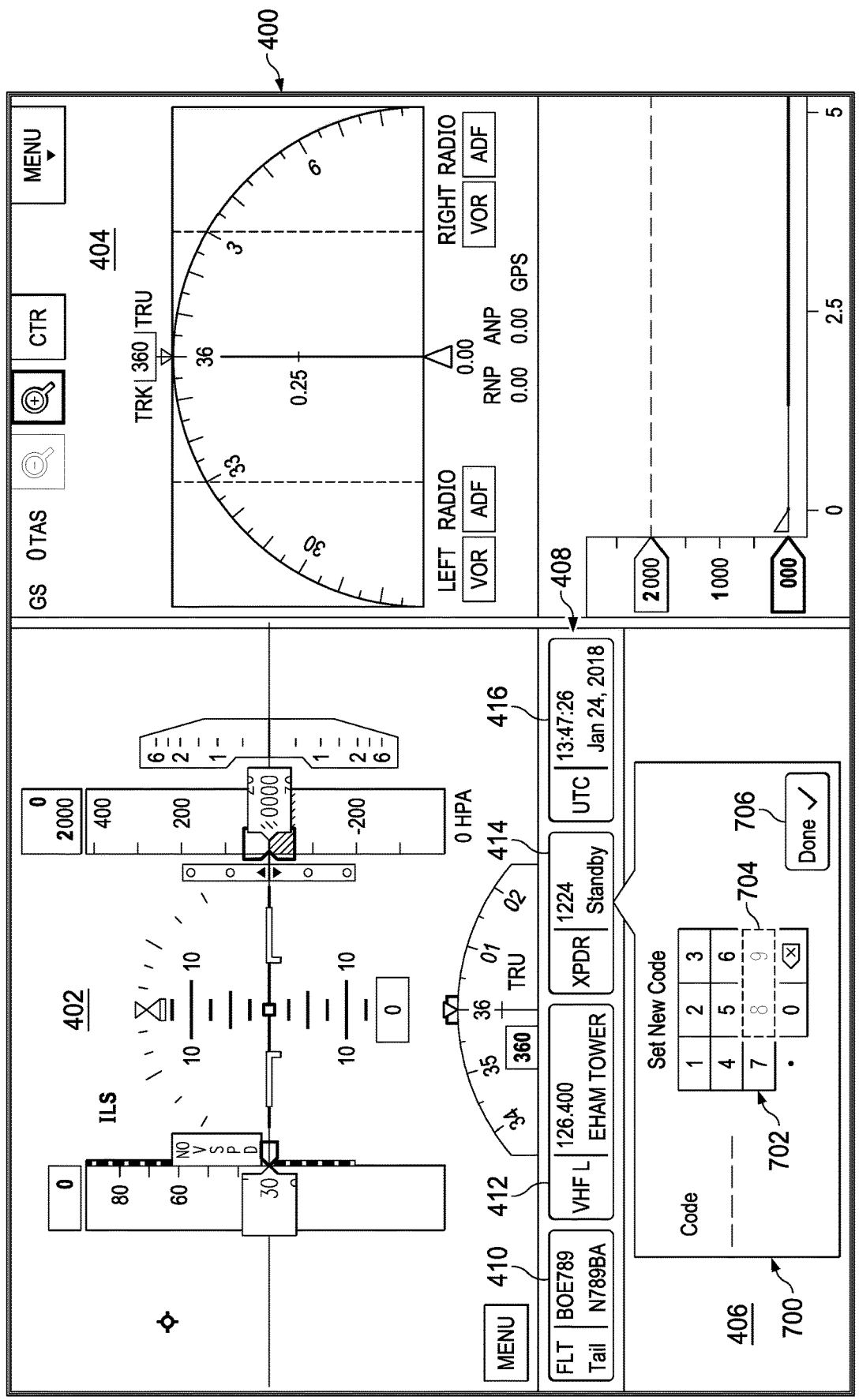
FIG. 7 is an illustration of another transponder pop-up window in a graphical user interface displayed on a display device in a flight deck of an aircraft in accordance with an illustrative embodiment.

With reference to FIG. 7, an illustration of another transponder pop-up window in a graphical user interface displayed on a display device in a flight deck of an aircraft is depicted in accordance with an illustrative embodiment. As depicted, transponder pop-up window 700 is displayed in response to a selection of code field 602 in transponder pop-up window 600 in FIG. 6.

In this depicted example, transponder pop-up window 700 provides keypad 702 as a control to receive user input to set a new transponder code. In this example, buttons 704 are not selectable because the numbers for these buttons are not valid transponder numbers.

Additionally, done button 706 is a control that is selected when transponder pop-up window 700 is no longer needed. The selection of done button 706 causes the display to return to transponder pop-up window 600 as shown in FIG. 6.

Figure 8:
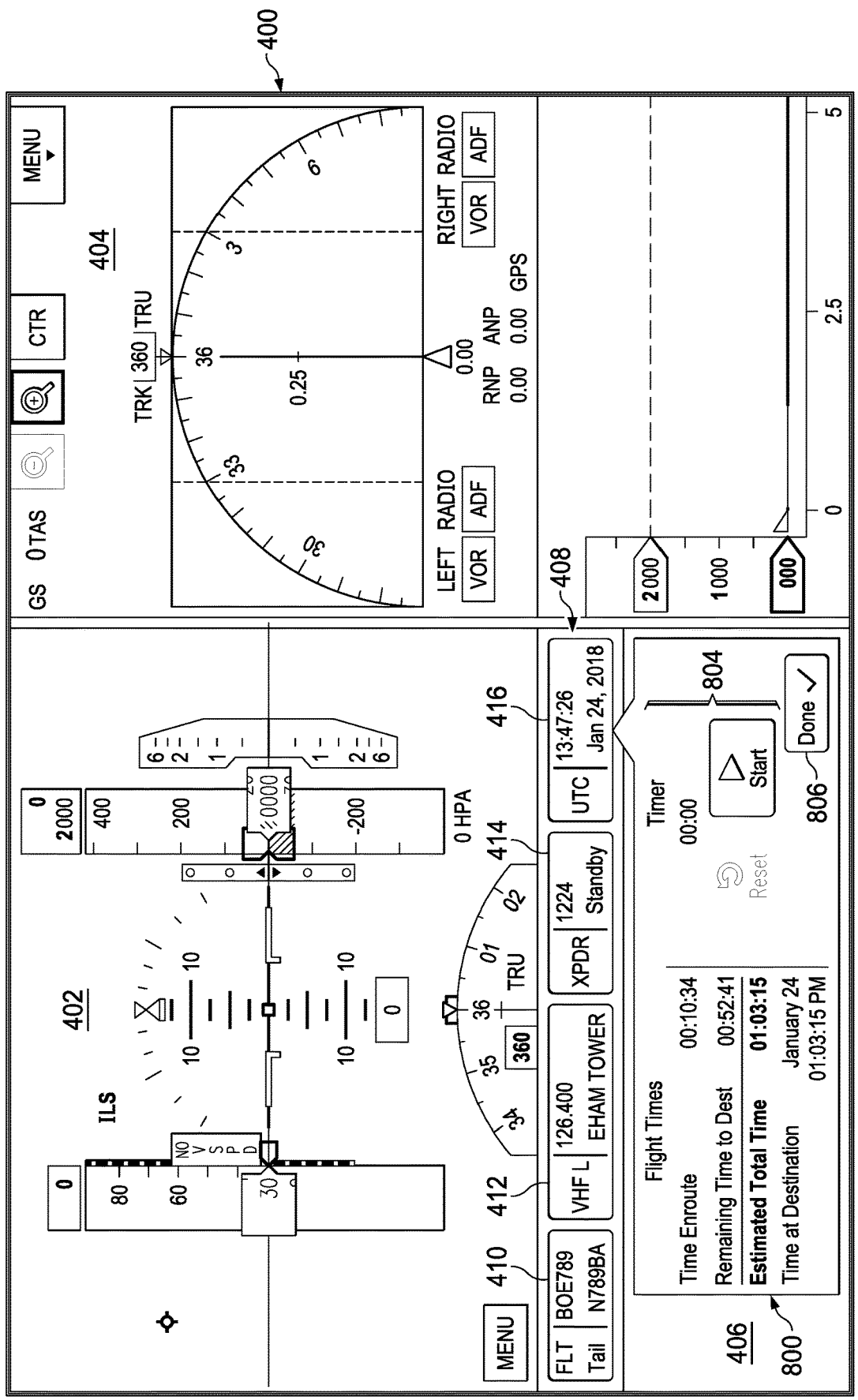
FIG. 8 is an illustration of a time pop-up window in a graphical user interface displayed on a display device in a flight deck of an aircraft in accordance with an illustrative embodiment.

Turning next to FIG. 8, an illustration of a time pop-up window in a graphical user interface displayed on a display device in a flight deck of an aircraft is depicted in accordance with an illustrative embodiment. In this illustrative example, time pop-up window 800 is displayed in response to a user input selecting time 416 in interactive strip 408.

As depicted, time pop-up window 800 displays time information 802. In this example, time information 802 includes flight times such as time enroute, time remaining to destination, and estimated total time. Time information 802 also includes the date and time at the destination.

Further, time pop-up window 800 also includes timer 804. Timer 804 operates as a stopwatch in this illustrative example. Done button 806 may be selected when time pop-up window 800 is no longer needed.

Figure 9:
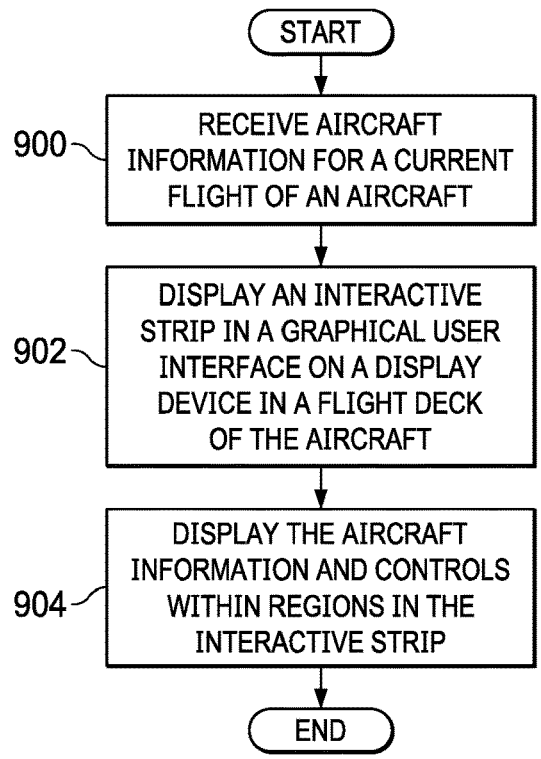
FIG. 9 is an illustration of a flowchart of a process for displaying information for an aircraft on a display device in a flight deck of the aircraft in accordance with an illustrative embodiment.

Turning next to FIG. 9, an illustration of a flowchart of a process for displaying information for an aircraft on a display device in a flight deck of the aircraft is depicted in accordance with an illustrative embodiment. The process illustrated in FIG. 9 can be implemented in at least one of software or hardware. With software, the program code is used to implemented the different operations in the flowchart. In this example, the operations can be implemented in information controller 208 running on computer system 204 in aircraft 202 in FIG. 2.

The process begins by receiving aircraft information for a current flight of an aircraft (operation 900). In step 900, the aircraft information can be received from at least one of a flight management system, an engine-indicating and crew-alerting system, a communications system, or some other aircraft system in aircraft 202 in FIG. 2.

Next, the process displays an interactive strip in a graphical user interface on a display device in a flight deck of the aircraft (operation 902). The process displays the aircraft information and controls within regions in the interactive strip (operation 904). The process terminates thereafter. The process in FIG. 9 enables a crew member of an aircraft, such as a pilot, to operate the aircraft using the interactive strip.

Figure 10:
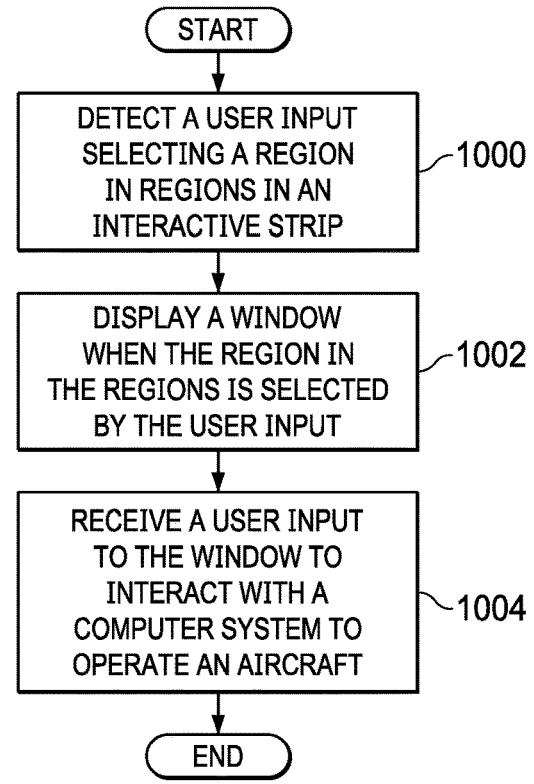
FIG. 10 is an illustration of a flowchart of a process for displaying a window for an interactive strip in accordance with an illustrative embodiment.

With reference now to FIG. 10, an illustration of a flowchart of a process for displaying a window for an interactive strip is depicted in accordance with an illustrative embodiment. The process illustrated in FIG. 10 can be implemented in at least one of software or hardware. With software, the program code is used to implemented the different operations in the flowchart. In this example, the operations can be implemented in information controller 208 running on computer system 204 in aircraft 202 in FIG. 2.

The process begins by detecting a user input selecting a region in regions in an interactive strip (operation 1000). The process displays a window when the region in the regions is selected by the user input (step 1002). The process receives a user input to the window to interact with a computer system to operate an aircraft (operation 1004). The process sends a command to an aircraft system in the aircraft when a control in the controls in the interactive strip is manipulated by a user input. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
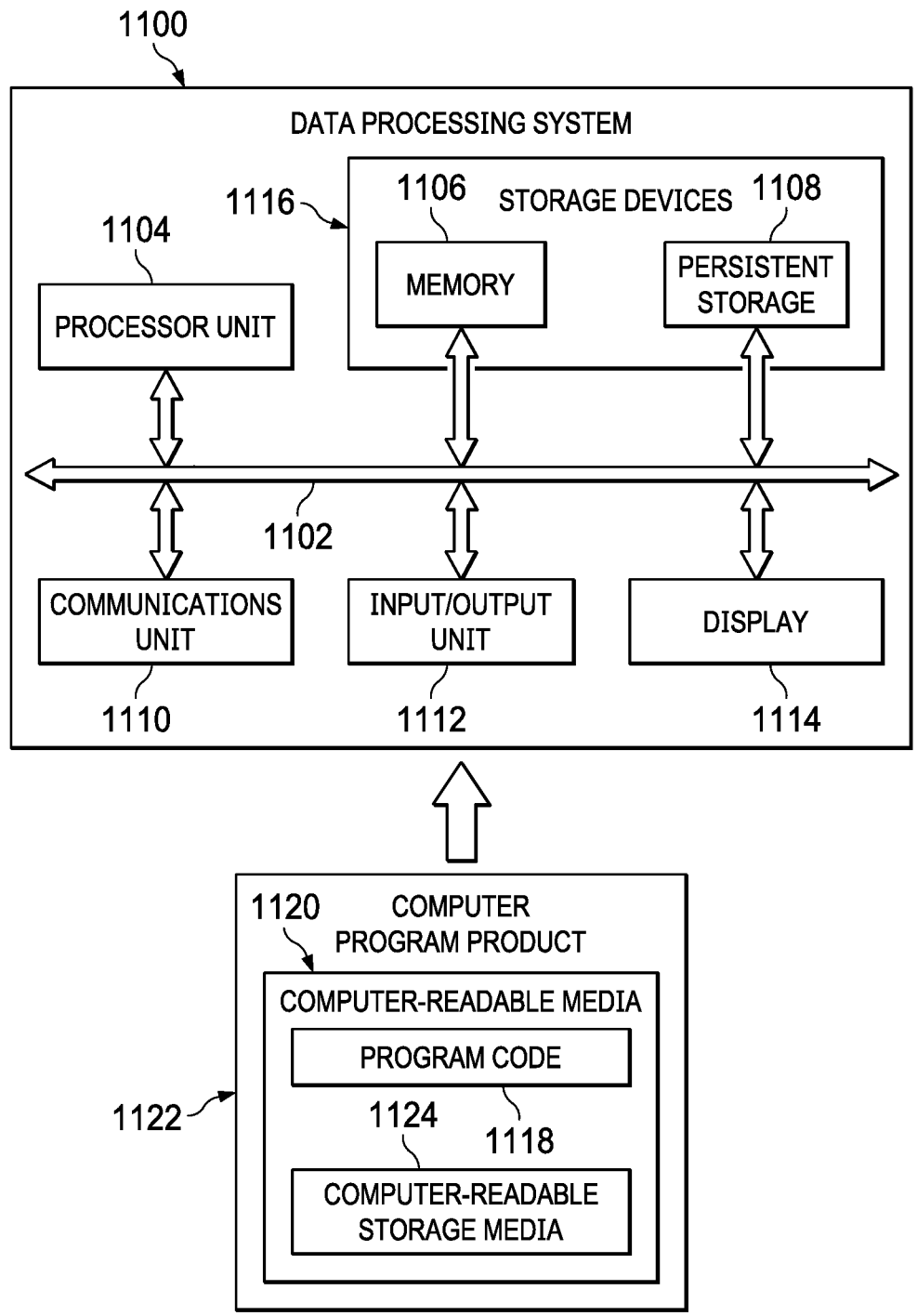
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement computer system 204 and aircraft systems 240 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid-state drive (SSD), a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 may be transferred to data processing system 1100 using a computer-readable signal media. The computer-readable signal media may be, for example, a propagated data signal containing program code 1118. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Figure 12:
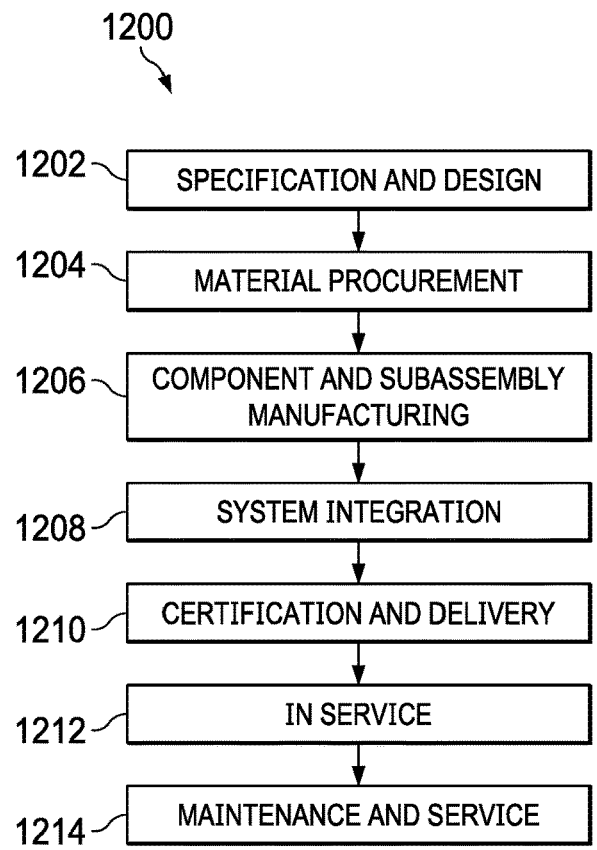
FIG. 12 is an illustration of a block diagram of an aircraft manufacturing and service method in accordance with an illustrative embodiment.
Figure 13:
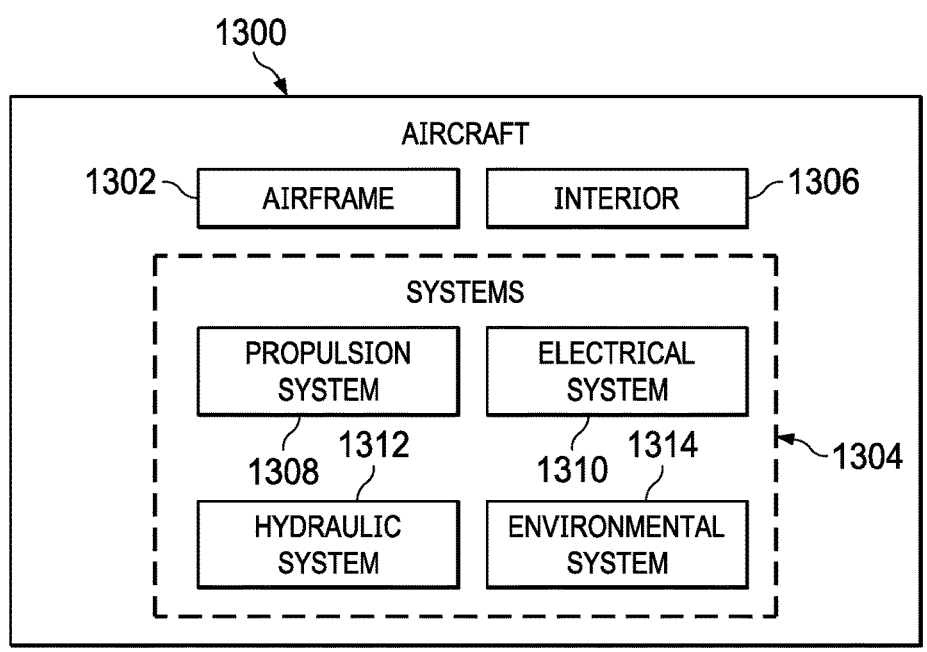
FIG. 13 is an illustration of a block diagram of an aircraft in which an illustrative embodiment may be implemented.

Illustrative embodiments of the disclosure may be described in the context of aircraft manufacturing and service method 1200 as shown in FIG. 12 and aircraft 1300 as shown in FIG. 13. Turning first to FIG. 12, an illustration of a block diagram of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of a block diagram of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12.

In one illustrative example, components or subassemblies produced in component and subassembly manufacturing 1206 in FIG. 12 may be fabricated or manufactured in a manner similar to components or subassemblies produced while aircraft 1300 is in service 1212 in FIG. 12. As yet another example, one or more apparatus embodiments, method embodiments, or a combination thereof may be utilized during production stages, such as component and subassembly manufacturing 1206 and system integration 1208 in FIG. 12. One or more apparatus embodiments, method embodiments, or a combination thereof may be utilized while aircraft 1300 is in service 1212, during maintenance and service 1214 in FIG. 12, or both. For example, information controller 208 in FIG. 2 can be used during operation of aircraft 1300 to display interactive strip 226 in FIG. 2 while aircraft 1300 is in service 1214. In another example, information controller 208 can be installed on aircraft 1300 during maintenance and service 1214 as part of normal maintenance, reconfiguration, refurbishment, or upgrade of aircraft 1300.

The use of a number of the different illustrative embodiments may substantially expedite the assembly of aircraft 1300, reduce the cost of aircraft 1300, or both expedite the assembly of aircraft 1300 and reduce the cost of aircraft 1300. The use of information controller 208 to display interactive strip 226 in FIG. 2 enables reducing the amount of hardware in the flight deck of an aircraft. With the reduced amount of hardware, assembly can be expedited and cost can be reduced. Further, increased space in the flight deck and reduced weight can be achieved for aircraft 1300.

Thus, the illustrative embodiments provide a method, an apparatus, and a system for displaying information on a display device in a flight deck of an aircraft. In one illustrative embodiment, an aircraft control system comprises a computer system in an aircraft, a touch screen display device in the computer system, and an information controller running on computer system. The touch screen display device is located in a flight deck of the aircraft as a forward display. The information controller receives aircraft information from a group of aircraft systems in the aircraft and displays an interactive strip in a graphical user interface on the touch screen display device. The aircraft information and controls are located within regions in the interactive strip in which the aircraft information is for a current flight of the aircraft. The information controller sends a command to the group of aircraft systems in the aircraft when a control in the controls in the interactive strip is manipulated by a user input made to the touch screen display device, enabling a pilot to operate the aircraft using the interactive strip.

Thus, the use of a dynamic control center reduces the need for physical audio, radio, datalink, and flight management control panels. Additionally, in the illustrative examples, the display system reduces the size of the aisle stand in the flight deck. Thus, with reducing the amount of space needed to display and provide controls to the flight crew to operate an aircraft, the comfort of pilots and other flight crew in the flight deck of an aircraft also can be increased.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft control system comprising:
   a computer system in an aircraft;
   a touch screen display device in the computer system, wherein the touch screen display device is located in a flight deck of the aircraft as a forward display; and an information controller running on the computer system, wherein the information controller:
receives aircraft information from a group of aircraft systems in the aircraft;
displays an interactive strip in a graphical user interface on the touch screen display device in which the aircraft information and controls are located within regions in the interactive strip in which the aircraft information is for a current flight of the aircraft, wherein the interactive strip is displayed adjacent to a primary flight display and a navigation display in the graphical user interface;
displays a dynamic control center below the interactive strip, wherein the dynamic control center comprises a field in which a corresponding pop-up window appears in response to selection of one of the controls in the interactive strip, wherein the pop-up window points to the selected control in the interactive strip; and
sends a command to the group of aircraft systems in the aircraft when a control in the controls in the interactive strip is manipulated by a user input made to the touch screen display device, enabling a pilot to operate the aircraft using the interactive strip.

2. The aircraft control system of claim 1, wherein the information controller displays a window when a region among the regions in the interactive strip is selected by the user input.

3. The aircraft control system of claim 2, wherein the window is configured to receive a second user input to interact with the computer system to operate one of the aircraft.

4. The aircraft control system of claim 2, wherein the window is selected from one of a pop-up window, a message window, and a dialog box.

5. The aircraft control system of claim 1, wherein the regions in the interactive strip comprise flight information, radio information, transponder information, and time information.

6. An aircraft control system comprising:
a computer system in an aircraft;
a display device in the computer system; and
an information controller running on the computer system, wherein the information controller displays;
an interactive strip in a graphical user interface on the display device in which aircraft information and controls are located within regions in the interactive strip, and wherein the aircraft information is for a current flight of the aircraft, enabling a pilot to operate the aircraft using the interactive strip, and wherein the interactive strip is displayed adjacent to a primary flight display and a navigation display in the graphical user interface; and
a dynamic control center below the interactive strip, wherein the dynamic control center comprises a field in which a corresponding pop-up window appears in response to selection of one of the controls in the interactive strip, wherein the pop-up window points to the selected control in the interactive strip.

7. The aircraft control system of claim 6, wherein the information controller displays a window when a region among the regions in the interactive strip is selected by a user input.

8. The aircraft control system of claim 7, wherein the information controller dims other portions of the graphical user interface when the window is displayed.

9. The aircraft control system of claim 7, wherein the window is configured to receive a second user input to interact with the computer system to operate the aircraft.

10. The aircraft control system of claim 7, wherein the window is selected from one of a pop-up window, a message window, and a dialog box.

11. The aircraft control system of claim 6, wherein the aircraft information for the current flight is received from at least one of a flight management system, an engine-indicating and crew-alerting system, or a communications system.

12. The aircraft control system of claim 6, wherein the information controller sends a command to an aircraft system in the aircraft when a control in the controls in the interactive strip is manipulated by a user input.

13. The aircraft control system of claim 6, wherein the display device is a touch screen display device, and wherein the interactive strip is configured to receive a user input from the touch screen display device.

14. The aircraft control system of claim 6, wherein the regions in the interactive strip comprise flight information, radio information, transponder information, and time information.

15. The aircraft control system of claim 6, wherein the display device is located in a flight deck of the aircraft as a forward display in the flight deck of the aircraft.

16. A method for displaying aircraft information for an aircraft on a display device in a flight deck of the aircraft, the method comprising:
receiving the aircraft information for a current flight of the aircraft;
displaying an interactive strip adjacent to a primary flight display and a navigation display in a graphical user interface on the display device in the flight deck of the aircraft;
displaying a dynamic control center below the interactive strip, wherein the dynamic control center comprises a field in which a corresponding pop-up window appears in response to selection of one of the controls in the interactive strip, wherein the pop-up window points to the selected control in the interactive strip; and
displaying the aircraft information and controls within regions in the interactive strip, enabling a pilot to operate the aircraft using the interactive strip.

17. The method of claim 16 further comprising:
displaying a window when a region in the regions is selected by a user input.

18. The method of claim 17 further comprising:
dimming other portions of the graphical user interface when the window is displayed.

19. The method of claim 17 further comprising:
receiving a second user input to the window to interact with a computer system to operate the aircraft.

20. The method of claim 16, wherein the receiving the aircraft information for the current flight of the aircraft comprises:
receiving the aircraft information for the current flight from at least one of a flight management system, an engine-indicating and crew-alerting system, or a communications system.

21. The method of claim 16 further comprising:
sending a command to an aircraft system in the aircraft when a control in the controls in the interactive strip is manipulated by a user input.

22. The method of claim 16, wherein the display device is a touch screen display device, and wherein the interactive strip is configured to receive a user input from the touch screen display device.

* * * * *